(12) United States Patent
Chancharoen et al.

(10) Patent No.: US 7,818,868 B2
(45) Date of Patent: Oct. 26, 2010

(54) METHOD OF FABRICATING IRON-BASED ALLOY CLIP-ON WHEEL BALANCE WEIGHT

(75) Inventors: Pravuth Chancharoen, Samutprakarn (TH); Chuan Wang Lin, Chiangrai (TH)

(73) Assignee: P.C. Products International Co., Ltd., Samutprakarn (TH)

( * ) Notice: Subject to any disclaimer, the term of this patent is extended or adjusted under 35 U.S.C. 154(b) by 1195 days.

(21) Appl. No.: 11/436,673

(22) Filed: May 19, 2006

(65) Prior Publication Data
US 2007/0251078 A1 Nov. 1, 2007

(30) Foreign Application Priority Data
Apr. 28, 2006 (TH) ................ 0601001946

(51) Int. Cl.
B21D 39/00 (2006.01)
(52) U.S. Cl. ...................................... 29/509
(58) Field of Classification Search .................. 29/447, 29/509, 428, 458, 460, 464; 301/5.21, 53.5
See application file for complete search history.

(56) References Cited
U.S. PATENT DOCUMENTS

| | | | |
|---|---|---|---|
| 2,029,132 A | 1/1936 | Skelton |
| 2,029,561 A | 2/1936 | Du Sang |
| 2,036,757 A | 4/1936 | Hume |
| 2,049,703 A | 8/1936 | Hume |
| 2,122,064 A | 6/1938 | Hume |
| 2,122,065 A | 6/1938 | Hume |
| 2,197,364 A | 4/1940 | Hatch |
| 2,218,410 A | 10/1940 | Weaver |
| D132,030 S | 4/1942 | Kalajian |
| 2,459,568 A | 1/1949 | Albert |
| D161,006 S | 11/1950 | Dailey |
| 2,640,727 A | 6/1953 | Kennedy |
| 2,696,408 A | 12/1954 | Merriman |
| 2,822,290 A | 2/1958 | Webber |
| 2,950,142 A | 8/1960 | Albert |
| 3,008,768 A | 11/1961 | Kinsey et al. |
| 3,011,828 A | 12/1961 | Karig |
| 3,273,941 A | 9/1966 | Skidmore |

(Continued)

FOREIGN PATENT DOCUMENTS

DE 3642369 A1 6/1988

(Continued)

OTHER PUBLICATIONS

Fastenlerless caulking system (ENA-lock), www.enami.co.jp/eng/index.html, Enami Seiki K.K.

*Primary Examiner*—John C Hong
(74) *Attorney, Agent, or Firm*—Westerman, Hattori, Daniels & Adrian, LLP

(57) ABSTRACT

A method for producing an iron-based alloy clip-on wheel balance weight composed of an iron-based alloy weight body and a clip having one end caulking embedded to the weight body. The method includes the following steps: (1) prefabricating the iron-based alloy weight body and the clip, and (2) fixing the clip to the iron-based alloy weight body by caulking the clip to embed in the weight body to form an iron-based alloy clip-on wheel balance weight. The second step is performed in three axes to control positioning of the clip on the weight body.

6 Claims, 4 Drawing Sheets

U.S. PATENT DOCUMENTS

| | | |
|---|---|---|
| 3,495,877 A | 2/1970 | Morne |
| 3,633,263 A | 1/1972 | Hoeksema |
| 3,669,500 A | 6/1972 | Ende |
| 3,688,380 A | 9/1972 | Hofmann et al. |
| 3,890,008 A | 6/1975 | Lejeune |
| 3,905,648 A | 9/1975 | Skidmore |
| 3,960,409 A | 6/1976 | Songer |
| 4,300,803 A | 11/1981 | Chorosevic |
| 4,379,596 A | 4/1983 | Green et al. |
| 4,805,592 A | 2/1989 | Enami |
| 5,134,766 A | 8/1992 | Miller |
| 5,228,754 A | 7/1993 | Rogers |
| 5,678,946 A | 10/1997 | Enami |
| 5,733,016 A | 3/1998 | Brown |
| 5,959,205 A | 9/1999 | Yamaya et al. |
| 6,238,005 B1 | 5/2001 | Sugayauchi et al. |
| 6,250,721 B1 | 6/2001 | Oba et al. |
| 6,260,929 B1 | 7/2001 | Oba et al. |
| 6,364,421 B1 | 4/2002 | Pursley |
| 6,547,338 B2 | 4/2003 | Gross et al. |
| 6,581,444 B2 | 6/2003 | Bal |
| 6,641,910 B1 | 11/2003 | Bries et al. |
| 6,698,845 B2 | 3/2004 | Corte et al. |

FOREIGN PATENT DOCUMENTS

| | | |
|---|---|---|
| JP | 2000-120793 A | 4/2000 |
| JP | 2002-61714 A | 2/2002 |

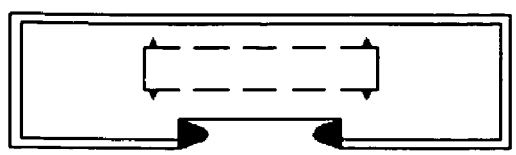
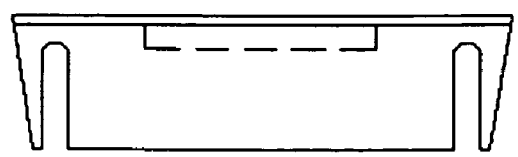
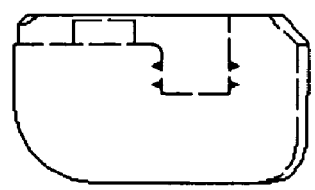
fig. 4

METHOD OF FABRICATING IRON-BASED ALLOY CLIP-ON WHEEL BALANCE WEIGHT

FIELD OF THE INVENTION

The present invention relates to a method for producing large-scale simple and low-cost iron-based alloy clip-on wheel balance weight which have three axis fixatives and triple points holding to the flange of the wheel.

BACKGROUND OF THE INVENTION

In a wheel assembly including a wheel and a tire, a dynamic imbalance may exist during manufacturing, due to the difference point of mass center and dimensional center during manufacturing of tire and wheel; we can probably control only the dimensional center in molding the tire and CNC wheel but can not or impossible to control the mass center in the tire and wheel, so when the wheel is rotated, various defects will occur such as a vibration or a noise. Generally, the method to compensate for this imbalance the wheel is provided with a balance weight, Usually, there are two kinds of fixative method to the wheel, which are by clip-on the rim and adhesives method. It is a skill in the art of wheel balance weights.

A conventional balance weight includes a weight body made from lead (Pb) and a clip having an end, which is embedded in said weight body. The record of the history patent in this field is listed in the United States Patent Classification (UPC) 301/5.21 to 5.22 and the International Patent Classification (IPC) B60B 1/00, 13/00.

We concluded the conventional manufacturing method thereof are as followings:

Weight Body: The weight body may be made of lead (Pb) or zinc (Zn). The weight body is manufacturing by gravity casting or die-casting.

Clip: Clip is a hook for mounting the balance weight to a flange of a wheel. The clip may be made of spring steel. The clip is fixed to the weight body by embedding an end portion of the clip in the weight body when the weight body is cast.

Heat Treatment: To obtain an elastic characteristic, a specific heat treatment is applied to the clip before the end of the clip is cast in the weight body. Because the melting point of lead is low, the elastic characteristic of the clip obtained by the heat treatment is not degraded when the end of the clip is cast in the weight body.

Surface Treatment: Surface treatment for prevention of rust and galvanizing corrosion coating is applied to the clip.

Metal Casting: Applied the clip to the one of the half mold, close the mold to pour the melted metal to fill the cavity and embedded the clip in the position.

Riveting: Riveting is a process used to bonding two parts together by drilling a hole put the rivet set into the hole, drawing a pin needle out which having one end bigger then the sleeve cylinder to expand to lock the hole. In U.S. Pat. No. 2,122,065 Hume Caulking: Caulking is a process used to seal the seams in wooden boats, in order to make them watertight, or to close up crevices in building against water, air, dust or insects. Caulking as a term has spread to the meaning the activity of closing up joints and gaps such as Enami Seiki machine or similar. In U.S. Pat. Nos. 6,250,721 and 6,238,005 used budded caulking in wheel balance weight.

Recently, there has been a trend to avoid the industrial use of heavy metals such as lead (Pb) for the purpose of environmental protection. Thus, the lead of the balance weight is apt to be substituted for other materials.

As an alternative materials from an industrial viewpoint, the materials which are considered such as iron or copper can be used, Those materials are inexpensive, environmentally friendly and have a relatively high density.

However, since those materials have a relatively high melting point, the following problems occurred with respect to manufacture of the weight body and to bond the clip to the weight body: First, in case of casting where an end of the clip is cast in the weight body, since the melting points of the clip and the weight body is close to each other, the elastic characteristic of the clip is degraded or deteriorated, and the effect of the casting is weakened. If heat treatment of the clip is conducted after the clip is cast with the weight body, the condition of the heat treatment is more series because heat to the clip will be absorbed by the weight body and the heat treatment will be accompany by an increase in cost. Second, in a case where a surface treatment is applied to the clip before the clip is cast with the weight body, the clip is exposed to a high temperature during casting and the heat-treated surface is degraded. Therefore, various limitations and more modifications of the manufacturing method will be necessary.

In order to solve those problems, the inventors have investigated manufacturing the weight body by cold forging and coupling the clip to the weight body by caulking, this caulking system uses no heat to bind two parts together by punch dies. It can be used for coated sheets, and work hardening can be reduced. The caulking in plastic processing supports high speed processing already.

However, there are the following problems with manufacturing the weight body by cold forging: First, by cold-forging the material to the shape-forming of the weight body requires a large pressing force and a large-sized press machine which increases the manufacturing costs. Second, it is difficult to form the material into the shape-forming of the weight body in one pressing step, a plurality of pressing steps will be necessary. These results are in a need for a plurality of sets of pressing dies, which also increases the manufacturing costs.

For the above-mentioned reasons, the cost of the balance weight will be high. Solutions for the cost problem are thus desired.

U.S. Pat. No. 6,238,005 try solving by manufacturing the weight body by engaging groove of said weight body by pawl portion formed by caulking said opened. In U.S. Pat. No. 6,250,721 try to solve the problem by coupling the clip to the weight body of ductile casting iron by caulking head of the pillar. Those two patents have some defects leaved that two sides caulking point linearly to the guiding aperture, and the clip is coupling to the underside of the weight body, if there are some defects while caulking the cast-iron which will often causing crack in the metallic ground-boundary and causing broken afterward, sometimes even the clip hammer to the rim of the wheel, but the weight body will be loosed freely. Refer to our example test.

SUMMARY OF THE INVENTION

An object of the present invention is to provide a method to produce a wheel balance weight, which is preferable environmental protection Another object of the present invention is to provide a method and process to fabricate large-scale wheel balance weight having a weight body which is simple to form and low costs.

Another object of the present invention is to provide a method and process to fabricate a wheel balance weight having a clip whose spring characteristic and surface treatment layer not deteriorated during coupling of the clip to the weight body.

Another object of the present invention is to provide a method and process to fabricate a wheel balance weight, which is without using special tool to install and not necessary to let the clip and body weight separated which is more difficult for inventory control.

Another object of the present invention is to provide a method and process to fabricate a wheel balance weight, which fix the position of the clip to the weight body in three-axis and triple points holding the wheel balance weight to the rim of wheel.

Another object of the present invention is to provide a method and process to fabricate a wheel balance weight which is using natural and agricultural processing waste to be rust protection and value-added.

Another object of the present invention is to provide a method and process to fabricate a wheel balance weight, which is using community manpower to pain designed aesthetic image shield covering to enhance the income of community.

Another object of the present invention is to provide a method and process to fabricate a wheel balance weight, which is self-sustained in community.

The above-described object is performed by a wheel balance weight according to the present invention.

The method for producing large-scale in simple and low-cost iron-based alloy clip-on wheel balance weight having clip fixed three axis to the weight body and triple points holding to the flange of the wheel comprising a weight body and a clip which embedded to the said weight body by the following steps:

a. iron-based alloy prefabricated in the profile shape of rod
b. cutting rod to a pellet and bending the desired curve in length
c. preheat to the desired temperature and hot-forging to form the shape
d. trimming the finned scrap
e. cleaning the surface contaminating and applying rust prevention agents
f. caulking bonding the clip to weight body; fixed in three-axis and after installation have triple holding to the flange of the wheel.
g. functional coating for corrosion inhibiting, color decoration
h. shield cover designed pattern to enhance the value-increasing and aesthetic image

BRIEF DESCRIPTION OF THE DRAWINGS

FIG. 4 is a plan and cross-sectional view of the shield cover of wheel balance weight of the invention; (a) top view (b) side view; (c) cross-sectional view after assembly to the balance weight.

DETAILED DESCRIPTION OF THE INVENTION

Figure 1:
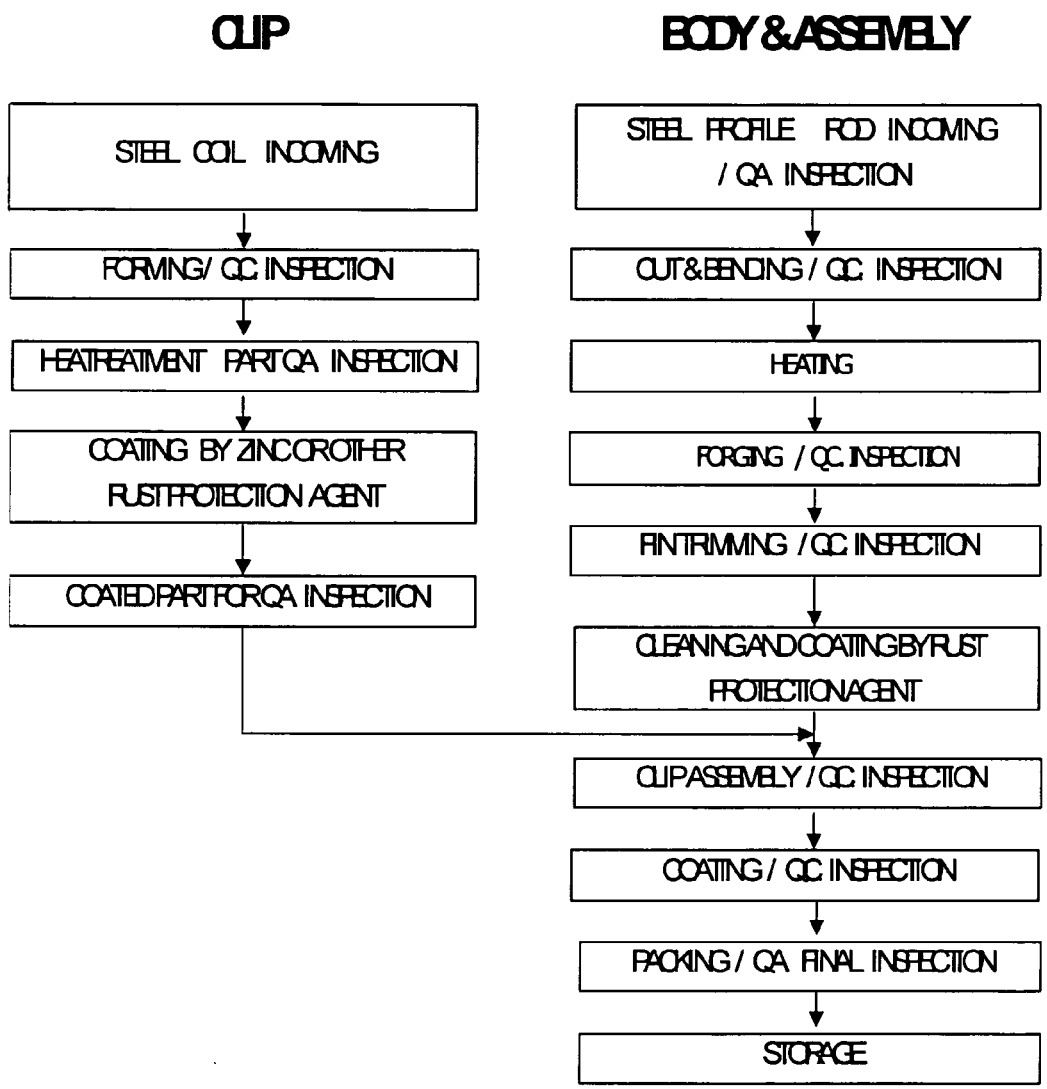
FIG. 1 is the flow chart of fabricate clip and weight body of the invention.
Figure 2:
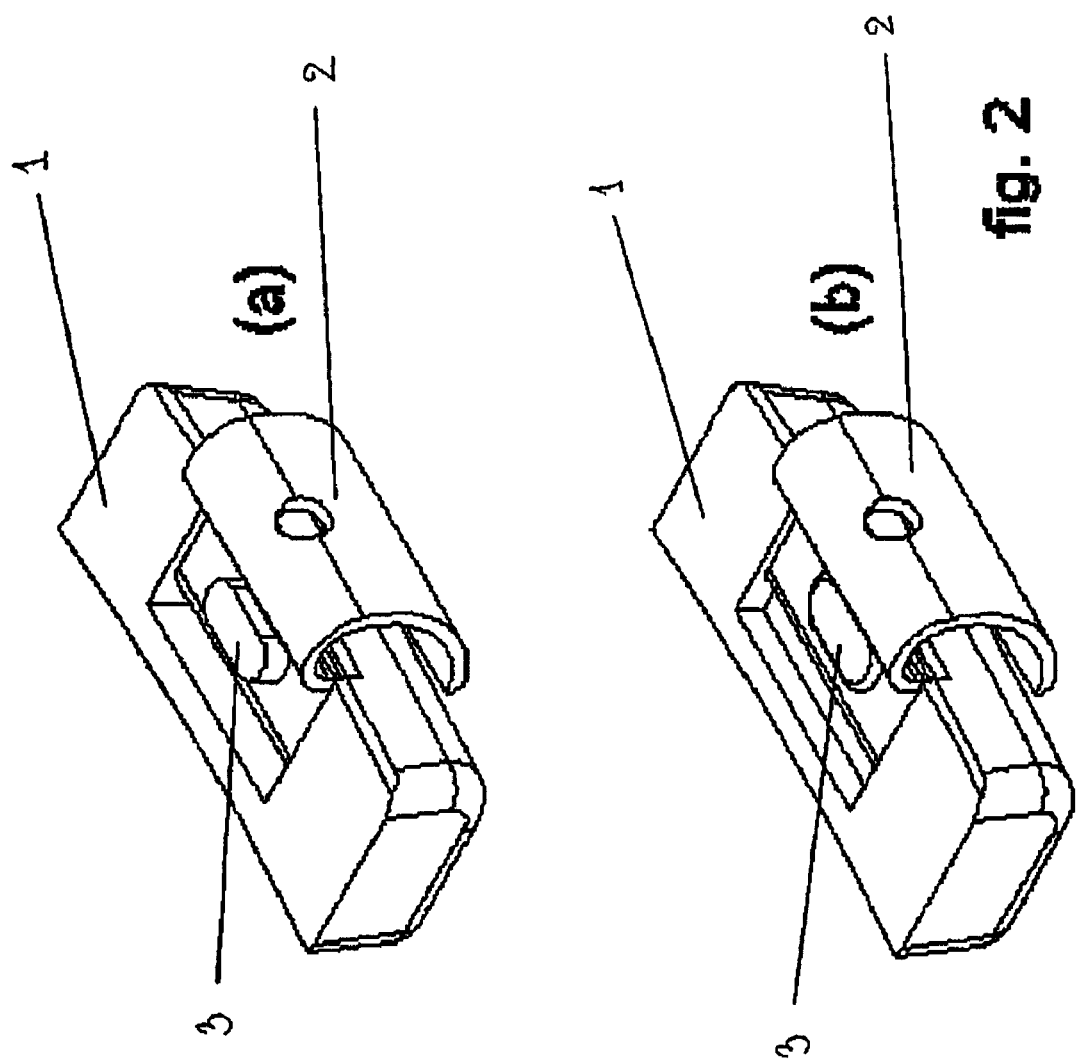
FIG. 2 is a perspective view of the clip and wheel balance weight of the invention; (a) before caulking the guiding pillow; (b) after caulking the guiding pillow.
Figure 3:
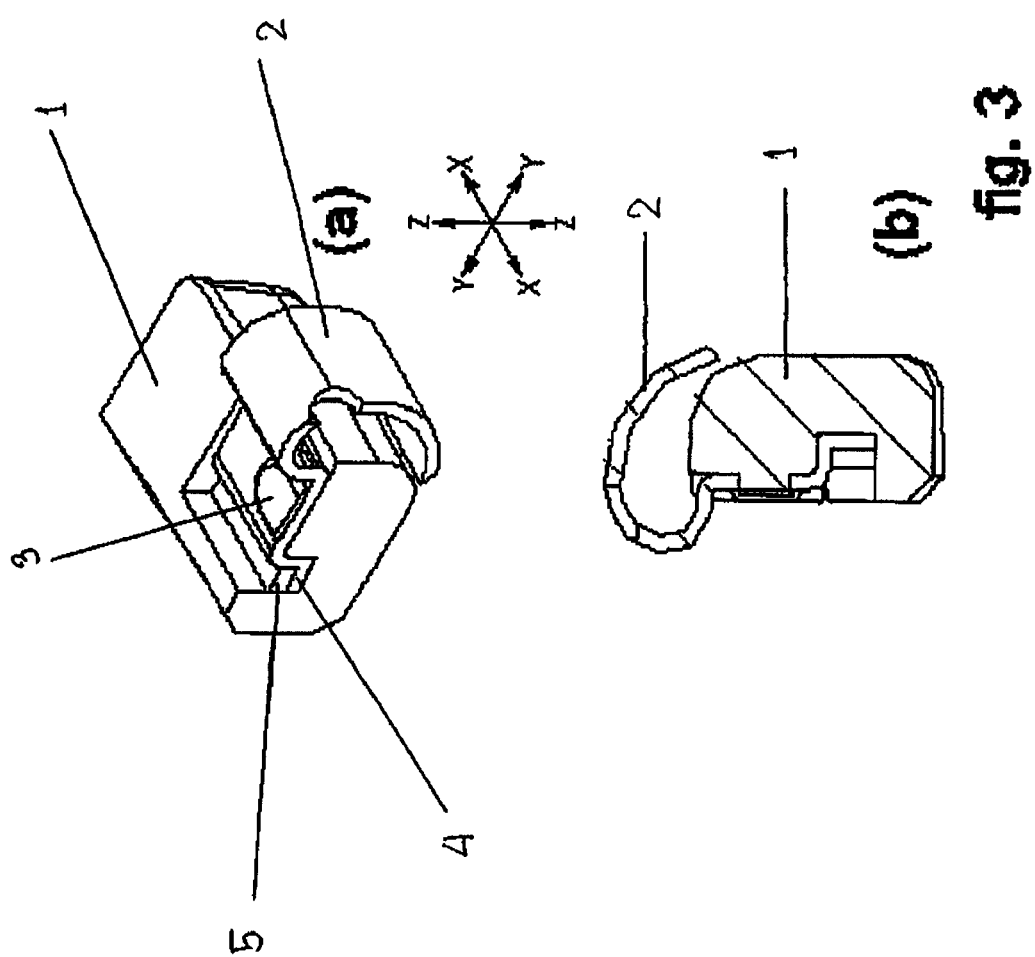
FIG. 3(a), 3(b) is a partial cross-sectional perspective view, and cross-sectional plan view of the wheel balance weight of the invention after caulking the clip at the Z-ending, respectively.

The method and process of fabricating large-scale in simple and low-cost iron-based alloy clip-on wheel balance weight having clip fixed three axis to the weight body and triple points holding to the flange of the wheel comprising a weight body and a clip which embedded to the said weight body by the following steps:

a. iron-based alloy prefabricated in the profile shape of rod
b. cutting rod to a pellet and bending the desired curve in length
c. preheat to the desired temperature and hot-forging to form the shape
d. trimming the finned scrap
e. cleaning the surface contaminating and applying the rust prevention agents
f. caulking bonding the clip to weight body; fixed in three-axis and after installation have triple holding to the flange of the wheel.
g. functional coating for corrosion inhibiting, color decoration
h. shield cover designed pattern to enhance the value-increasing and aesthetic image The method for producing large-scale in simple and low-cost iron-based alloy balance weight according to (a) comprising: iron-based alloy prefabricated by rolling to the rod 1 shape similar to the finished figure by hot-rolling. Iron-based alloy is best to be recycled from scrap iron.

The method for producing an iron-based alloy balance weight according to (b) comprising: cutting the rod 1 to a pellet in controlling the weight and modeling desired and bending the curve in length fixative to the rim of the wheel.

The method for producing an iron-based alloy balance weight according to (c) comprising: preheating the pellet from (b) above in stacking furnace; put pellets in a tray stacked in pile which is usually seven layers and feeding bottom up, rising the trays through the heating zone to the desired temperature at above 300° C., preferably in the range of 700 to 900° C., most preferably at 750° C. and output from the upper-side; the distance of traveling depends on the speed of heating efficiency and downstream step acceptance, usually 50 to 150 centimeters, preferred 100 centimeters in height; the stacking furnace may heating by LP gas, oil, and electric; the said pellets preheated to the desired temperature was transferred to forging press to shape-forming in one-step and to control the surplus substance to be finned in one-side of the gap side to be sure the complete full shape forming.

The method for producing an iron-based alloy balance weight according to (d) comprising: trimming the one-side finned scrap in a die-molding press.

The method for producing an iron-based alloy balance weight according to (e) comprising: cleaning the surface contamination during processing such as lubricating oil in rotation drum, such as hexagonal rotational drum which was put in the trimmed pellets combined with water-based detergent, such as glycerine from bio-diesel processing waste; abrading agent such as diatomite, rice-husk ashes; and with corrosion protecting agent from the extract of bark in eucalyptus which is plentiful in pulp chip industry.

The method for producing an iron-based balance weight according to (f) comprising: caulking bonding the pretreated clip 2 to embed in the balance weight body and guiding pillow 3; the said pretreated clip 2 is fabricated by spring steel coil with shape punched and formed, heat treatment to harden the steel, rust-preventing coating; the said clip 2 comprising: having a hook end extending along the upper surface of the said groove extended to the "Z" shape ending 4 which engaging to the "U" gap 5 and the said balance weight body comprising a coupled a radial portion arc and sloped to the configuration to the contact face to the flange of wheel rim; a groove at opposite said contact arc, a depth equal to or greater than a thickness of the clip 2, a "U" gap 5 in the longitudinally central portion of the weight body which the said clip 2 is embedded therein by caulking the side wall in bottom; totally fixed in three-axes: fixed in groove, x-x axis; fixed in guiding pillow , y-y axis, fixed in z-z axis by caulking; such three-axes fixing leading to triple points holding to the flange of the wheel: clip hook, weight body radial portion arc, clip end in caulking gap, by a simple hammer installation tool.

The method for producing an iron-based alloy balance weight according to (g) comprising three parts: functional powder coating comprising of resin-based powder is polyester, polystyrene, polypropylene; corrosion inhibiting agent is self-sacrifice cathode protection metallic powder is aluminum, zinc, and aluminum/Zinc alloyed powder; self-restoring agent is sodium silicate, glycerin; after the said powder coating by electrostatic spray coating, powder impregnated coating; the coated substance is transferred to cure in heating oven to melt the coating to the substance thereafter.

The method for producing an iron-based alloy balance weight according to (h) comprising: shield cover of designed pattern to enhance the secondary functional covering, value-increasing and aesthetic image; the said shield cover is metal, plastic, synthetic fabric, natural processing sheets which is nipped in the caulking bonding gap.

EXAMPLE

We need to prove our invention which the weight body after installation that have triple points holding to the flange of the wheel, we drilled out the guiding pillow of the clip and installed the weight body to the rim of the wheel which is firmly attached after 30 days off-road testing; but the difference result of the U.S. Pat. No. 6,250,721 and 6,238,005, in the same condition of drilled out the guiding pillow but the unknown reasons that the weight body departed from the clip and leaved the clip holding to the flange of the wheel only.

According to the wheel balance weight of the present invention, the engaging member can be fixed to the weight body by caulking, where the Z-ending portion of the engaging member is fitted into the engaging groove of the weight body and guiding pillar, which is a balance center in operation of caulking. As a result the fixing portions in three axis or area of the engaging member to the weight body increases, so that the engaging member can be fixed to the weight body firmly and securely. Such three axis engaging member lead to the triple points holding of balance weight to the flange of the wheel.

It is not intended to limit the invention to the above description only, many variations, such as might readily occur to one skilled in the art, being possible, without departing from the scope of this invention

The invention claimed is:

1. A method for producing an iron-based alloy clip-on wheel balance weight composed of an iron-based alloy weight body and a clip having one end caulking embedded to said weight body, said method comprising the following steps:

prefabricating the iron-based alloy weight body and the clip; and fixing the clip to the iron-based alloy weight body by caulking the clip to embed in said weight body to form an iron-based alloy clip-on wheel balance weight, wherein the step of fixing the clip to the iron-based alloy weight body is performed in three axes to control positioning of the clip on the weight body; fixing the clip in a groove to control x-x axis of the iron-based alloy wheel balance weight, fixing the clip to a guiding pillow to control y-y axis of the iron-based alloy wheel balance weight, and fixing the clip in the groove and to the guiding pillow by caulking in order to control z-z axis of the iron-based alloy wheel balance weight.

2. The method according to claim 1 wherein the step of prefabricating the iron-based alloy weight body comprises the steps of:

rolling a rod to have a cylindrical shape;

cutting the rod to a pellet in the controlling weight and modeling desired and bending the curve in the length which the curve is fixed to a rim of a wheel;

preheating said pellet to a desired temperature and transferring said preheating pellet to a forging press to form shape and control a flash to emerge at one side to be sure a complete full shape forming in one step;

trimming a finned scrap in a die-molding press; and cleaning a surface contaminating in rotating or vibrating drum with cleaning agents and the same time, with rust protection agents.

3. The method according to claim 2 wherein in the step of preheating, the pellet is preheated to the desired temperature above 300° C. to soften the pellet.

4. The method according to claim 3 wherein the desired temperature is in the range of 700-900° C.

5. The method according to claim 3 wherein the desired temperature is 750° C.

6. The method according to claim 1 wherein the clip in the prefabricating step is formed to have a hook end extending along upper surface of the groove of the weight body; the groove having a guiding pillow therein, and extending to a second end in z-shape which engaging to embedded in the weight body by caulking and to the guiding pillow thereof.

\* \* \* \* \*